United States Patent
Dunik et al.

(10) Patent No.: US 10,422,872 B2
(45) Date of Patent: Sep. 24, 2019

(54) INTEGRITY MONITORING OF RADAR ALTIMETERS

(71) Applicant: Honeywell International Inc., Morris Plains, NJ (US)

(72) Inventors: Jindrich Dunik, Plzen (CZ); Milos Sotak, Slavkov u Brna (CZ); Zdenek Kana, Dubnany (CZ); David C. Vacanti, Renton, WA (US); Michal Dobes, Olomouc (CZ)

(73) Assignee: Honeywell International Inc., Morris Plains, NJ (US)

( * ) Notice: Subject to any disclaimer, the term of this patent is extended or adjusted under 35 U.S.C. 154(b) by 600 days.

(21) Appl. No.: 15/170,322

(22) Filed: Jun. 1, 2016

(65) Prior Publication Data

US 2017/0350973 A1 Dec. 7, 2017

(51) Int. Cl.
  *G01S 13/88* (2006.01)
  *G01C 21/16* (2006.01)
  (Continued)

(52) U.S. Cl.
  CPC .......... *G01S 13/882* (2013.01); *G01C 21/165* (2013.01); *G01C 21/20* (2013.01);
  (Continued)

(58) Field of Classification Search
  None
  See application file for complete search history.

(56) References Cited

U.S. PATENT DOCUMENTS 5,760,737 A    6/1998  Brenner
6,281,832 B1 * 8/2001  McElreath ............ G01C 5/005
                                       340/963
(Continued)

FOREIGN PATENT DOCUMENTS

CN    101319902        12/2008
CN    107449443 A      12/2017

OTHER PUBLICATIONS

European Patent Office, "Extended European Search Report for EP Application No. 17170286.3", Foreign Counterpart to U.S. Appl. No. 15/170,322, dated Feb. 15, 2018, pp. 1-11, Published in: EP.

(Continued)

*Primary Examiner* — Vladimir Magloire
*Assistant Examiner* — Donald H B Braswell
(74) *Attorney, Agent, or Firm* — Fogg & Powers LLC (57) ABSTRACT

Methods for radar altimeter integrity monitoring are provided. One method comprises obtaining one or more GNSS measurements, or one or more hybridized GNSS/INS measurements, in an earth-centered-earth-fixed (ECEF) coordinate frame for a vehicle; obtaining one or more altitude measurements from one or more radar altimeters; transforming the altitude measurements into the ECEF coordinate frame using a terrain map and a GNSS or hybridized GNSS/INS based position estimate with ensured integrity; determining a full solution estimate of position for the vehicle based on the transformed altitude measurements, and the GNSS or hybridized GNSS/INS measurements; determining one or more sub-solution estimates of position based on a subset of the transformed altitude measurements, and the GNSS or hybridized GNSS/INS measurements; comparing the full solution estimate with the sub-solution estimates using statistical analysis; and determining an alti- (Continued)

tude protection level based on a probability of hazardous misleading information and a probability of false detection.

12 Claims, 8 Drawing Sheets

(51) Int. Cl.
| | |
|---|---|
| *G01C 21/20* | (2006.01) |
| *G01C 21/30* | (2006.01) |
| *G01S 7/40* | (2006.01) |
| *G01S 13/08* | (2006.01) |
| *G01S 13/86* | (2006.01) |
| *G01S 19/47* | (2010.01) |
| *G01S 19/20* | (2010.01) |

(52) U.S. Cl.
CPC ............. *G01C 21/30* (2013.01); *G01S 7/40* (2013.01); *G01S 13/08* (2013.01); *G01S 13/86* (2013.01); *G01S 19/20* (2013.01); *G01S 19/47* (2013.01)

(56) References Cited

U.S. PATENT DOCUMENTS

| | | | | |
|---|---|---|---|---|
| 7,145,501 B1* | 12/2006 | Manfred | ................ | G01C 5/005 342/120 |
| 8,296,056 B2* | 10/2012 | Becker | .................. | G01C 23/00 701/408 |
| 8,498,758 B1* | 7/2013 | Bell | ..................... | G01C 23/005 244/180 |
| 9,542,782 B2* | 1/2017 | Blank, Sr. | .............. | G07C 5/085 |
| 9,547,086 B2 | 1/2017 | Dunik et al. | | |
| 2005/0017721 A1* | 1/2005 | McCracken | .............. | G01V 3/16 324/330 |
| 2015/0145724 A1 | 5/2015 | Kana et al. | | |
| 2017/0139055 A1* | 5/2017 | Soysal | .................... | G01S 19/48 |

OTHER PUBLICATIONS

European Patent Office, "Partial EP Search Report from EP Application No. 17170286.3 dated Nov. 2, 2017", from Foreign Counterpart of U.S. Appl. No. 15/170,322, dated Nov. 2, 2017, pp. 1-14, Published in: EP.

Braff, "GPS III—Galileo/Altimeter Landing System for CAT IIIB: Concept and Analysis", "Navigation: Journal of the Institute of Navigation", Mar. 1, 2009, pp. 267-281, vol. 55, No. 4, Published in: Fairfax, VA.

Lee, "RAIM Availability for GPS Augmented with Barometric Altimeter Aiding and Clock Coasting", Navigation: Journal of the Institute of Navigation, Sep. 1, 1993, pp. 179-198, vol. 40, No. 2, Published in: Fairfax, VA.

U.S. Coast Guard, "NAVSTAR GPS User Equipment Introduction", NAVSTAR GPS User Equipment Introduction, Sep. 1, 1996, pp. 2-3.

Felux et al., "Analysis of a GNSS/Radar Altimeter Integration for Improved Touch-Down Performance in Automatic Landings", Apr. 7, 2016, pp. 1-15.

Giremus et al., "A GLR Algorithm to Detect and Exclude Up to Two Simultaneous Range Failures in a GPS/Galileo/IRS Case", https://hal-enac.archives-ouvertes.fr/hal-01022192, Oct. 31, 2014, pp. 2910-2923, Published in: US.

* cited by examiner

INTEGRITY MONITORING OF RADAR ALTIMETERS

BACKGROUND

A radar altimeter is an aircraft sensor that measures altitude above terrain by transmitting a radio signal and receiving a reflection of the signal from a terrain surface. The radar altimeter measured altitude is an important piece of information used by a pilot and onboard systems (e.g., an autopilot system) during the various phases of flight, including approach and landing.

Currently, an aircraft is usually equipped with several radar altimeters. Typically, the measurements from all radar altimeters are processed (e.g., compared to each other) and the resulting value of the altitude is provided to onboard systems and the pilot. However, the altitude is provided without any information related to its accuracy or integrity, which limits utilization of radar altimeter measurements in envisioned applications related to more autonomous aircraft.

Accuracy and integrity of the navigation information (horizontal and vertical position) provided by a Global Navigation Satellite System (GNSS) based navigation system or hybridized Global Navigation Satellite System and Inertial Navigation System (GNSS/INS) based navigation system with respect to possible faults of GNSS satellites has been solved since the advent of GNSS-based navigation systems. However, accuracy and integrity of the navigation information provided by a navigation system utilizing radar altimeters with respect to possible faults of the radar altimeter has not been addressed yet.

SUMMARY

Methods for radar altimeter integrity monitoring are provided. One method comprises obtaining one or more global navigation satellite system (GNSS) measurements, or one or more hybridized GNSS/inertial navigation system (INS) measurements, in an earth-centered-earth-fixed (ECEF) coordinate frame for a vehicle; obtaining one or more altitude measurements from one or more radar altimeters on the vehicle; transforming the one or more altitude measurements into the ECEF coordinate frame using a terrain map and a GNSS or hybridized GNSS/INS based position estimate with ensured integrity; determining a full solution estimate of position for the vehicle based on the transformed one or more altitude measurements, and the one or more GNSS or hybridized GNSS/INS measurements; determining one or more sub-solution estimates of position for the vehicle based on a subset of the transformed one or more altitude measurements, and the one or more GNSS or hybridized GNSS/INS measurements; comparing the full solution estimate with the one or more sub-solution estimates using statistical analysis; and determining an altitude protection level for the vehicle based on a probability of hazardous misleading information and a probability of false detection.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which.

DETAILED DESCRIPTION

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

Altitude above the ground or terrain (i.e., the clearance) information with assured accuracy and integrity is an important component of envisioned aircraft avionics architecture. Accordingly, systems and methods for integrity monitoring of radar altimeters are described herein, which allow for computation of the accuracy (e.g., in terms of the standard deviation) and integrity (protection level) of the altitude above terrain measured by the radar altimeters and possibly other sensors (e.g., global navigation satellite system (GNSS)).

The proposed integrity monitoring methods are based on a statistical comparison of the radar altimeter measurements with outputs of other navigation systems and sensors, and in principle, offer a trade-off between accuracy and integrity. The integrity monitoring methods are based on the concept of solution separation integrity monitoring.

Further details of the present systems and methods are described hereafter with reference to the drawings.

Figure 1:
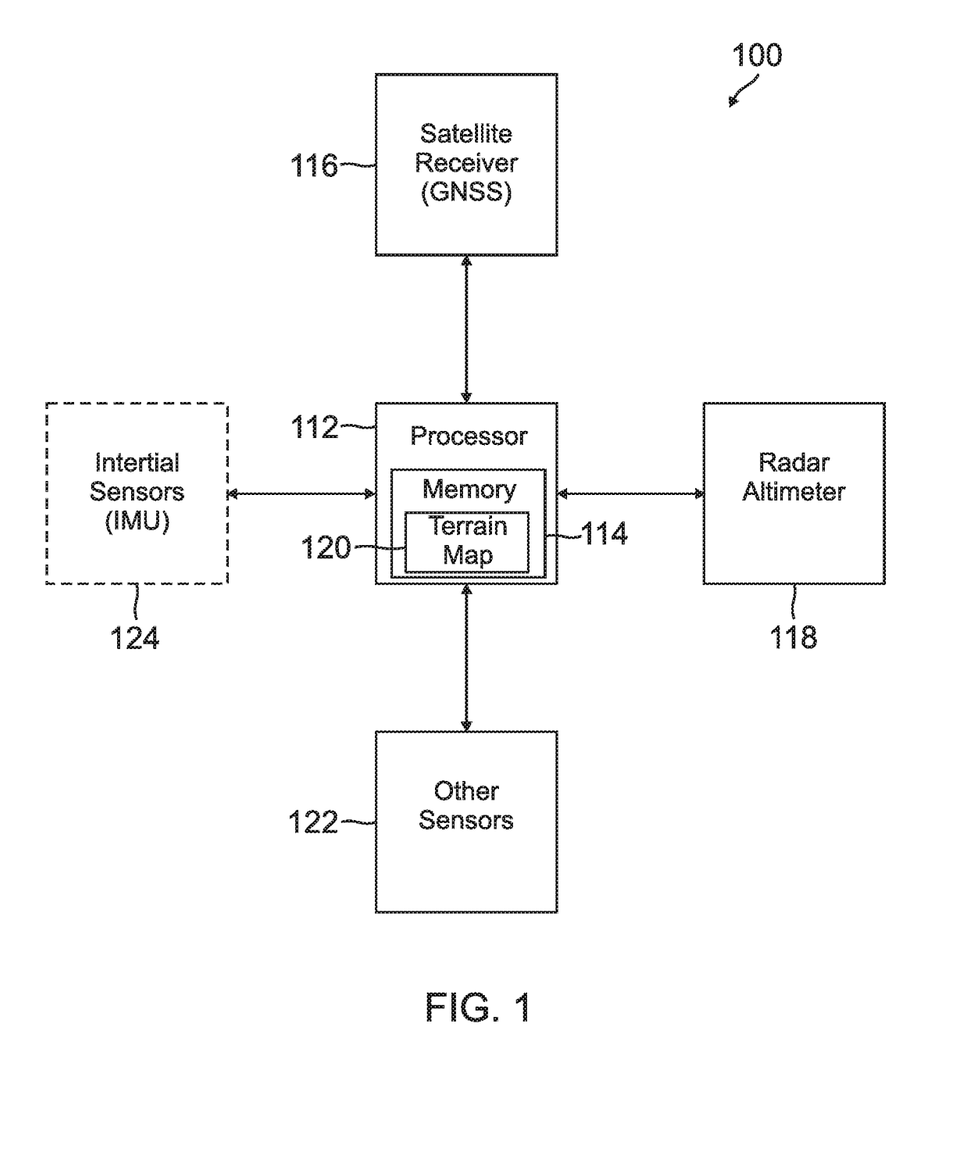
FIG. 1 is a block diagram of a navigation system according to one embodiment, which can implement radar altimeter integrity monitoring in a vehicle.

FIG. 1 illustrates a navigation system 100 according to one embodiment, which can implement the radar altimeter integrity monitoring methods in an aircraft. The navigation system 100 generally includes at least one processor 112 operatively coupled with at least one memory unit 114, at least one satellite receiver 116 such as a GNSS receiver in operative communication with processor 112, at least one radar altimeter 118 also in operative communication with processor 112, and a terrain map 120 stored in memory unit 114. The navigation system 100 can also include one or more additional sensors 122, such as a barometric altimeter, which provide additional sensor data to processor 112.

In an alternative embodiment, navigation system 100 can be hybridized by also including an inertial navigation system (INS) 124 having one or more inertial sensors that provide inertial data to processor 112. In one embodiment, the inertial sensors are implemented in an inertial measurement unit (IMU), which includes three accelerometers for measuring acceleration in three dimensions and three gyroscopes for measuring angular velocity relative to a reference plane.

The present integrity monitoring methods include centralized radar altimeter integrity monitoring, parallel radar altimeter integrity monitoring, and combined radar altimeter integrity monitoring. These approaches are described as follows.

Centralized Radar Altimeter Integrity Monitoring

The centralized radar altimeter integrity monitoring (cRIM) method employs an extended version of the solution separation disclosed in U.S. Pat. No. 5,760,737 to Brenner, entitled NAVIGATION SYSTEM WITH SOLUTION SEPARATION APPARATUS FOR DETECTING ACCURACY FAILURES, the disclosure of which is incorporated by reference herein. In principle, the solution separation computes the protection levels (the integrity information) on the basis of position estimate covariance matrices (accuracy information) of the full-solution and all sub-solutions. The full-solution processes all available GNSS measurements, and the sub-solution processes a subset of the GNSS measurements selected according to specified GNSS fault states to be mitigated. The solution separation also computes the protection levels on the basis of probabilities of false detection and missed detection, in which user-defined parameters are allocated according to either equal or free allocation schemes. The probability of missed detection is related to the probability of hazardous misleading information (HMI) and a priori probability of the faults.

The cRIM method extends the solution separation by considering one or more radar altimeter measurements as additional satellite measurements. In order to be able to process the radar altimeter measurement(s) expressed in the navigation (NAV) frame in a GNSS (or hybridized) navigation system, it is necessary to assume an available terrain map and transform the radar altimeter measurement into the Earth-Centered-Earth-Fixed (ECEF) coordinate system, i.e., to the coordinate system of GNSS measurements. The transformed radar altimeter measurement can be, in principle, then considered as a measurement provided by a satellite located at the ECEF frame origin.

The transformed radar altimeter measurement is given by the following equation:

$$\tilde{\rho}_{RA,transformed} = \tilde{\rho}_{RA} + \hat{\rho}_{TERMAP} \quad (1)$$

where $\tilde{\rho}_{RA}$ is the radar altimeter (RA) measurement (altitude above terrain in NAV frame), and $\hat{\rho}_{TERMAP}$ is the estimate of the orthogonal distance between the ECEF frame origin and the terrain at the point given by the horizontal position of the aircraft and available terrain map; thus, it depends on the horizontal position provided, for example, by GNSS, which is a random variable.

The radar altimeter measurement is characterized by a measurement noise description (probability density function or at least the moments; mean and covariance matrix), and a radar altimeter failure probability. These are a given. The orthogonal distance estimate is characterized by a distribution with a certain mean and variance (defining accuracy) computed on the basis of horizontal position moments and terrain map properties. The orthogonal distance estimate integrity is characterized by a terrain map failure probability given by the map and horizontal position integrity information. The errors affecting the horizontal position estimate, map, and radar altimeter measurement are assumed to be independent.

The cRIM method requires computation of the transformed radar altimeter measurement characteristics, especially of the orthogonal distance $\rho_{TERMAP}$ moments. The mean value can be computed as:

$$\hat{\rho}_{TERMAP} = E[\rho_{TERMAP}] = \text{function}_1(\hat{\rho}_{HOR}, \text{map}) \quad (2)$$

where $\hat{\rho}_{HOR}$ is the aircraft horizontal position estimate (e.g., from GNSS navigation system) and map is the terrain map. The variance of $\rho_{TERMAP}$ is given, in the simplest case, by the map accuracy. Moments of the orthogonal distance can be also computed by other techniques for computation of moments of nonlinearly transformed random variables, e.g., by the unscented transformation or by methods based on a numerical integration.

The radar altimeter measurement and orthogonal distance estimate are assumed to be independent random variables, allowing for straightforward computation of the transformed radar altimeter measurement moments. The integrity of the transformed radar altimeter measurement is given by the probability of failure of the radar altimeter, the GNSS (or hybridized) horizontal position navigation information integrity, and information coming from map integrity (according to addition law of probability).

Figure 2:
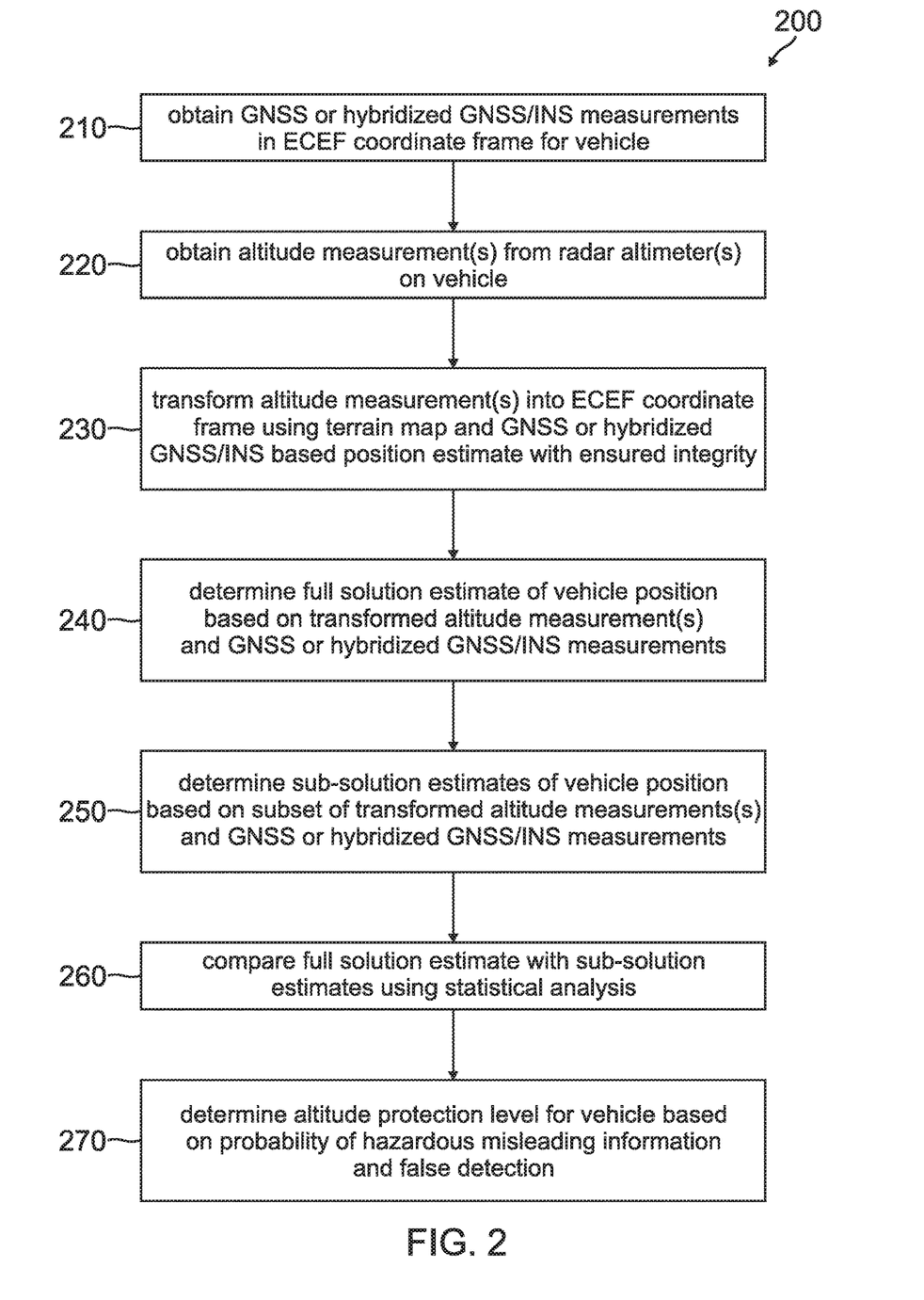
FIG. 2 is a flow diagram for a method of implementing centralized radar altimeter integrity monitoring for a vehicle.

FIG. 2 is a flow diagram for a method 200 for implementing the centralized radar altimeter integrity monitoring. Initially, one or more GNSS or hybridized GNSS/INS measurements are obtained in an ECEF coordinate frame for a vehicle (block 210), and one or more altitude measurements are obtained from one or more radar altimeters on the vehicle (block 220). The altitude measurement(s) are transformed into the ECEF coordinate frame using a terrain map and a GNSS or hybridized GNSS/INS based position estimate with ensured integrity (block 230). A full solution estimate of position is determined for the vehicle, based on the transformed altitude measurement(s) and the GNSS or hybridized GNSS/INS measurements (block 240). The method 200 also determines sub-solution estimates of position for the vehicle, based on a subset of the transformed altitude measurement(s) and the GNSS or hybridized GNSS/INS measurements (block 250). Thereafter, the full solution estimate is compared with the sub-solution estimates using statistical analysis (block 260). An altitude protection level for the vehicle is then determined based on a probability of hazardous misleading information and a probability of false detection (block 270).

In the cRIM method, the full solution processes all GNSS measurements, all transformed radar altimeter measurements, and additional sensor measurements (e.g., from barometric altimeter and IMU). The sub-solutions process a subset of all GNSS and transformed radar altimeter measurements (e.g., by excluding one GNSS or radar altimeter measurement if a single failure is assumed), and additional sensor measurements.

The computation of the solution separation parameter (Dn) and the error parameter (an), which are related to the altitude for all sub-solutions, is based on moments of the full solution and sub-solutions. The computation of altitude protection level is based on the probability of hazardous misleading information (HMI), the probability of false detection, the probability of satellite failure, the probability of radar altimeter failure (including a map related integrity allocation), and probabilities of wide failures (probabilities that all GNSS and altitude measurements affected by a failure).

Figure 3:
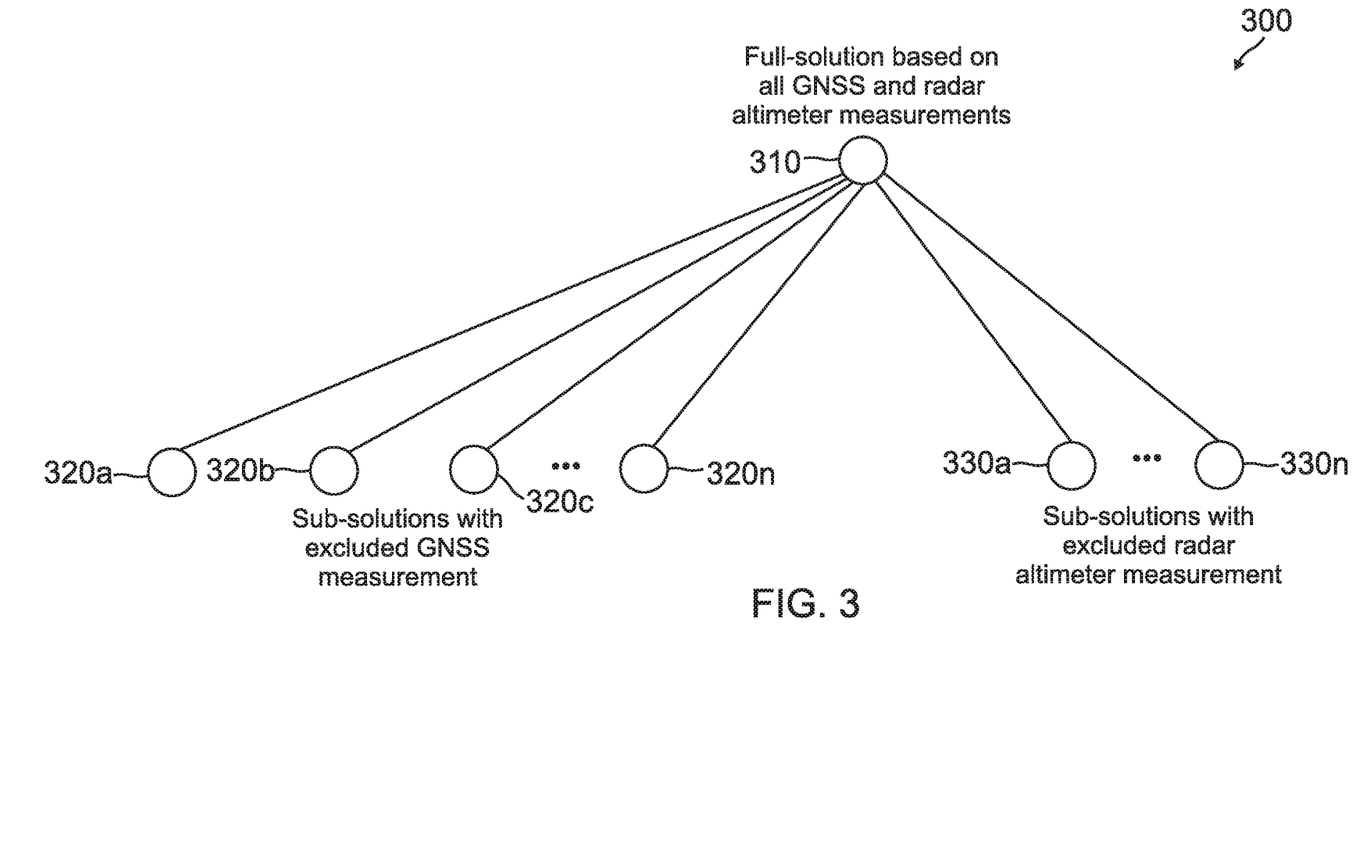
FIG. 3 is a schematic diagram illustrating an exemplary architecture for implementing centralized radar altimeter integrity monitoring for a vehicle.

FIG. 3 illustrates an exemplary cRIM architecture 300, with a single failure assumption (either one GNSS or one radar altimeter failed). The full solution based on all GNSS measurements and radar altimeter measurements is indicated at 310. The sub-solutions processing all available measurements of radar altimeters and all but one of the GNSS measurements are indicated at 320a, 320b, 320c, . . . 320n. Each sub-solution excludes a different GNSS measurement. The sub-solutions processing all GNSS measurements and all but one of the radar altimeter measurements are indicated at 330a, . . . 330n. Each sub-solution excludes a different radar altimeter measurement. Note that the radar altimeter measurements are supposed to be transformed from the navigation frame to the ECEF frame as described above. Then, all the sub-solutions are statistically compared with the full-solution according to the concept of the solution separation, and it is decided whether all GNSS and radar measurements are healthy or one of the measurements is affected by a failure.

Parallel Radar Altimeter Integrity Monitoring

The parallel radar altimeter integrity monitoring (pRIM) method employs an extended version of the weighted architecture of the high integrity solution separation disclosed in U.S. Patent Publication No. 2015/0145724 to Kana et al., entitled ARCHITECTURES FOR HIGH INTEGRITY MULTI-CONSTELLATION SOLUTION SEPARATION, the disclosure of which is incorporated by reference herein. In principle, the high integrity solution separation computes the (local) protection areas independently for several disjunctive sub-groups of satellites, and the resulting protection area is the one somehow overbounding all the local protection areas. Each radar altimeter measurement can be considered as a sub-group providing measurement and characteristic of altitude above terrain.

Figure 4:
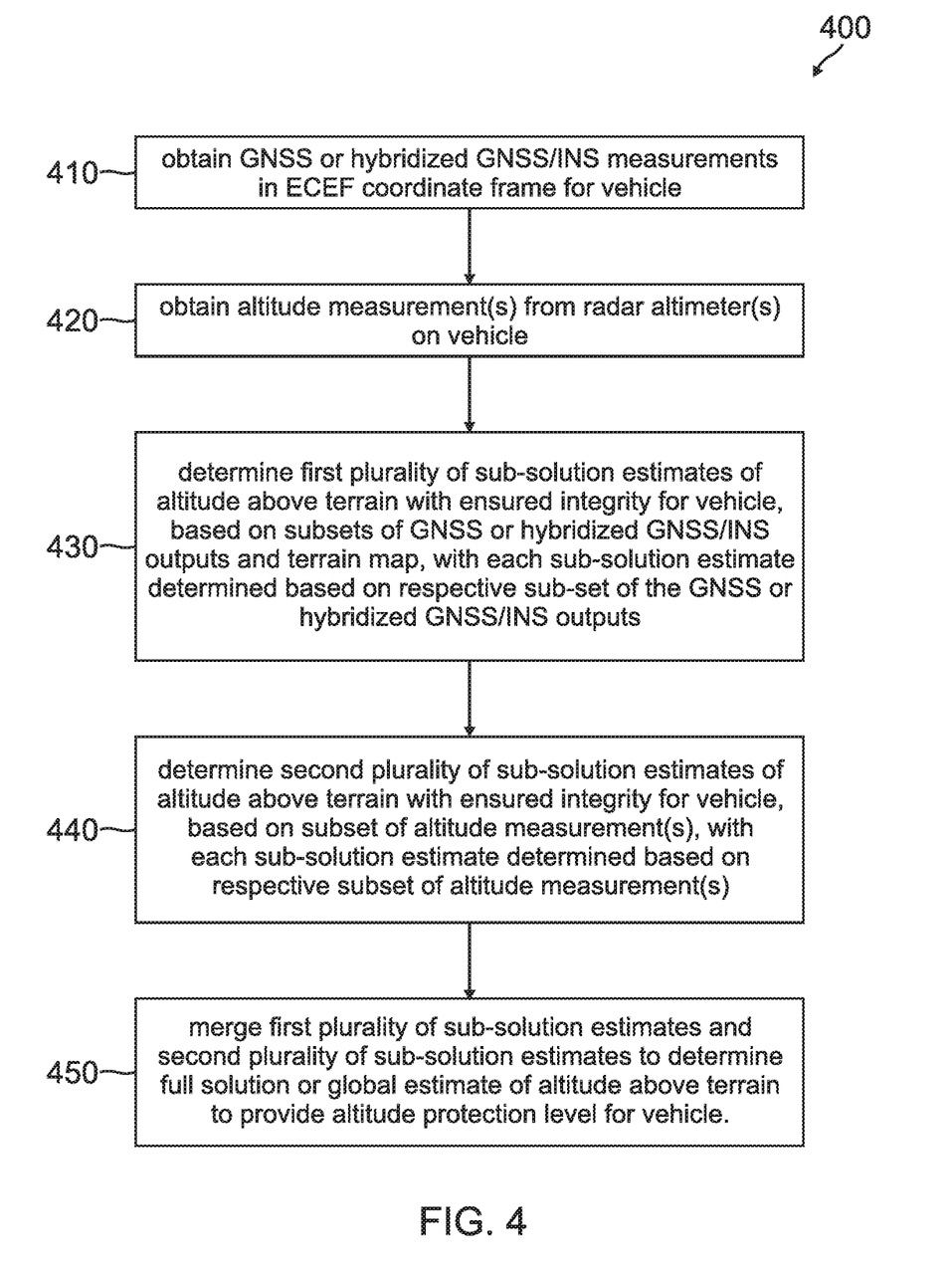
FIG. 4 is a flow diagram for a method of implementing parallel radar altimeter integrity monitoring for a vehicle.

FIG. 4 is a flow diagram for a method 400 for implementing the parallel radar altimeter integrity monitoring. Initially, one or more GNSS or hybridized GNSS/INS measurements are obtained in an ECEF coordinate frame for a vehicle (block 410), and one or more altitude measurements are obtained from one or more radar altimeters on the vehicle (block 420). The method 400 determines a first plurality of sub-solution estimates of altitude above terrain with ensured integrity for the vehicle, based on subsets of the one or more GNSS or hybridized GNSS/INS outputs and a terrain map, with each sub-solution estimate determined based on a respective subset of the one or more GNSS or hybridized GNSS/INS outputs (block 430) as detailed below. The method 400 also determines a second plurality of sub-solution estimates of altitude above terrain with ensured integrity for the vehicle, based on a subset of the one or more altitude measurements, with each of these sub-solution estimates being determined based on a respective subset of the one or more altitude measurements (block 440). The method 400 then merges the first plurality of sub-solution estimates and second plurality of sub-solution estimates to determine a full solution or global estimate of altitude above terrain, which provides an altitude protection level for the vehicle (block 450).

Figure 5:
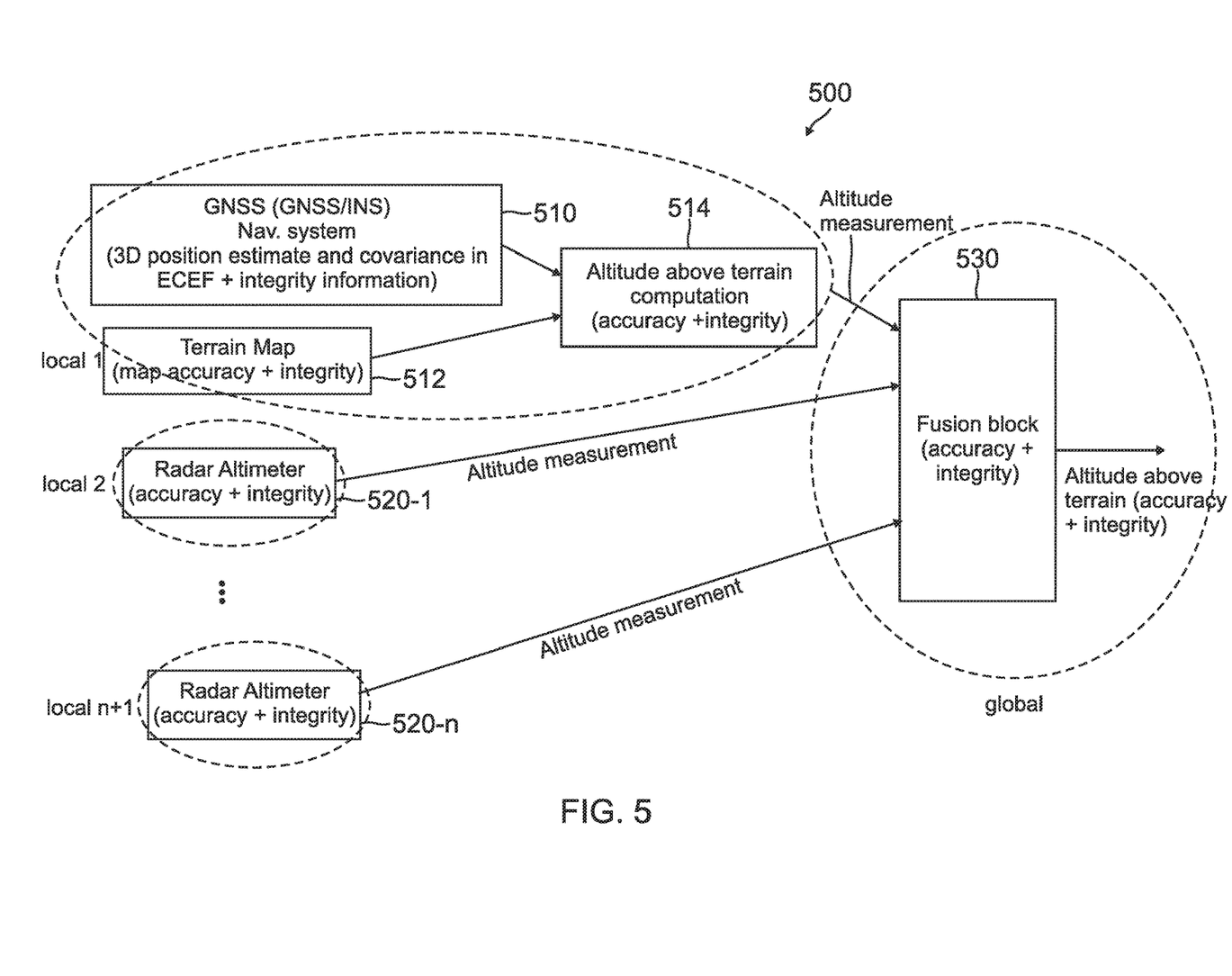
FIG. 5 is a block diagram illustrating an exemplary architecture for implementing the parallel radar altimeter integrity monitoring for a vehicle.

FIG. 5 is a block diagram illustrating an exemplary pRIM architecture 500, which includes a GNSS (or hybridized GNSS/INS) navigation system 510, which employs a terrain map 512. The navigation system 510 provides a three-dimensional (3D) position estimate of a vehicle and covariance in ECEF, plus integrity information. The terrain map 512 includes information on map accuracy plus integrity. The outputs from navigation system 510 and terrain map 512 are used to compute the estimate of altitude above terrain at computation block 514, which includes accuracy and integrity information, such as probability density function (or moments) of the horizontal position estimate, related probability of failure (or of hazardous misleading information), and accuracy and integrity of the map. Thus, the altitude estimate moments depend on the moments of the horizontal position estimate and terrain map properties. The probability of failure (or of hazardous misleading information) related to the computed altitude estimate depends on the integrity of the terrain map and the integrity of the navigation system horizontal position estimate, both of which need to be computed as described hereafter.

One or more radar altimeters 520-1 to 520-$n$ provide measurement or measurements of the altitude above terrain, respectively. For each considered altimeter, information related to its accuracy and integrity is supposed to be known. The statistical description of the radar altimeter measurement noise is available (defining its accuracy), along with the probability of radar altimeter failure (defining its integrity).

A fusion block 530, which computes overall (or global) altitude along with its accuracy and integrity information, is configured to receive the altitude estimate from computation block 514 (local 1), and the altitude measurements from radar altimeters 520-1 to 520-$n$ (local 2 to local n+1). The fusion block 530 merges the (local) altitude estimate and measurements to produce a global estimate output of altitude above terrain with ensured integrity and accuracy.

The pRIM method is based on computation of the altitude estimate above terrain and its characteristics (integrity and variance (or other moments) defining altitude estimate accuracy) on the basis of GNSS horizontal position estimate and a terrain map. The altitude estimate mean value can be computed in the same way as in the cRIM method discussed previously. The variance can be computed as:

$$\mathrm{var}[\rho_{TERMAP}] = \sigma_{MAP}^2 + \sigma_{MAP,HPint}^2 \quad (3)$$

where $\sigma_{MAP}^2$ is given by the terrain map accuracy and $\sigma_{MAP,HPint}^2$ describes the additional uncertainty given by the GNSS horizontal position protection area. The term $\sigma_{MAP,HPint}^2$ can be computed on the basis of terrain map evaluation (scanning) at multiple points within the protected horizontal area given by horizontal protection level (HPL) as:

$$\sigma_{MAP,HPint}^2 = \mathrm{function}_2(\hat{\rho}_{HOR}, \mathrm{HPL}, \mathrm{map}) \quad (4)$$

Figure 6:
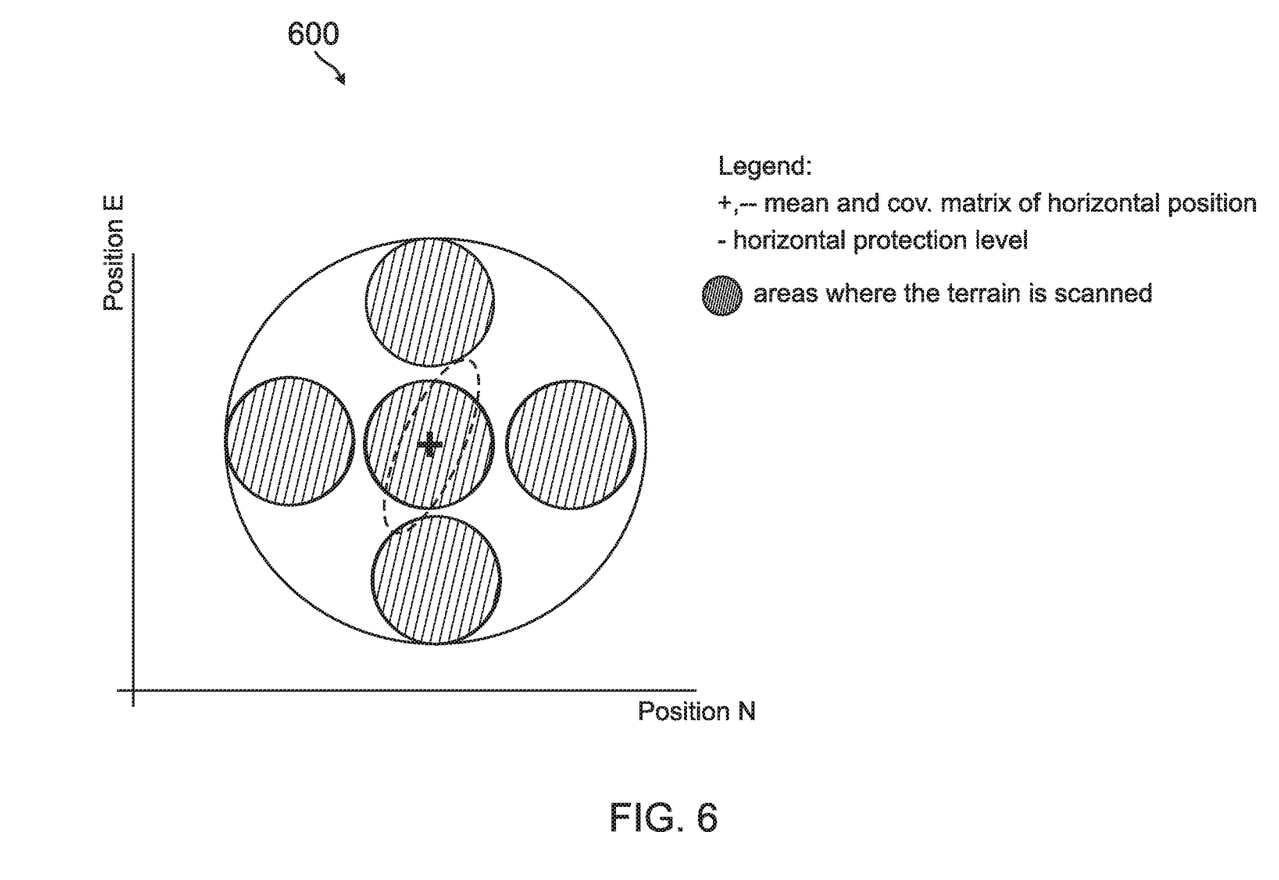
FIG. 6 is a graphical representation of an exemplary computation of altitude characteristics for the parallel radar altimeter integrity monitoring.

FIG. 6 is a graphical representation 600 of an exemplary pRIM computation of uncertainty $\sigma_{MAP,HPint}^2$. FIG. 6 shows the mean and covariance matrix of horizontal position, and the HPL. The GNSS HPL defines the area used for computation of the uncertainty $\sigma_{MAP,HPint}^2$. The computation is based on evaluation (or scanning) of the terrain variability at multiple points in the area computed on the basis of the available map. The integrity of the altitude estimate is given by the integrity of the GNSS horizontal position and of the map computed according to the addition law of probability.

Figure 7:
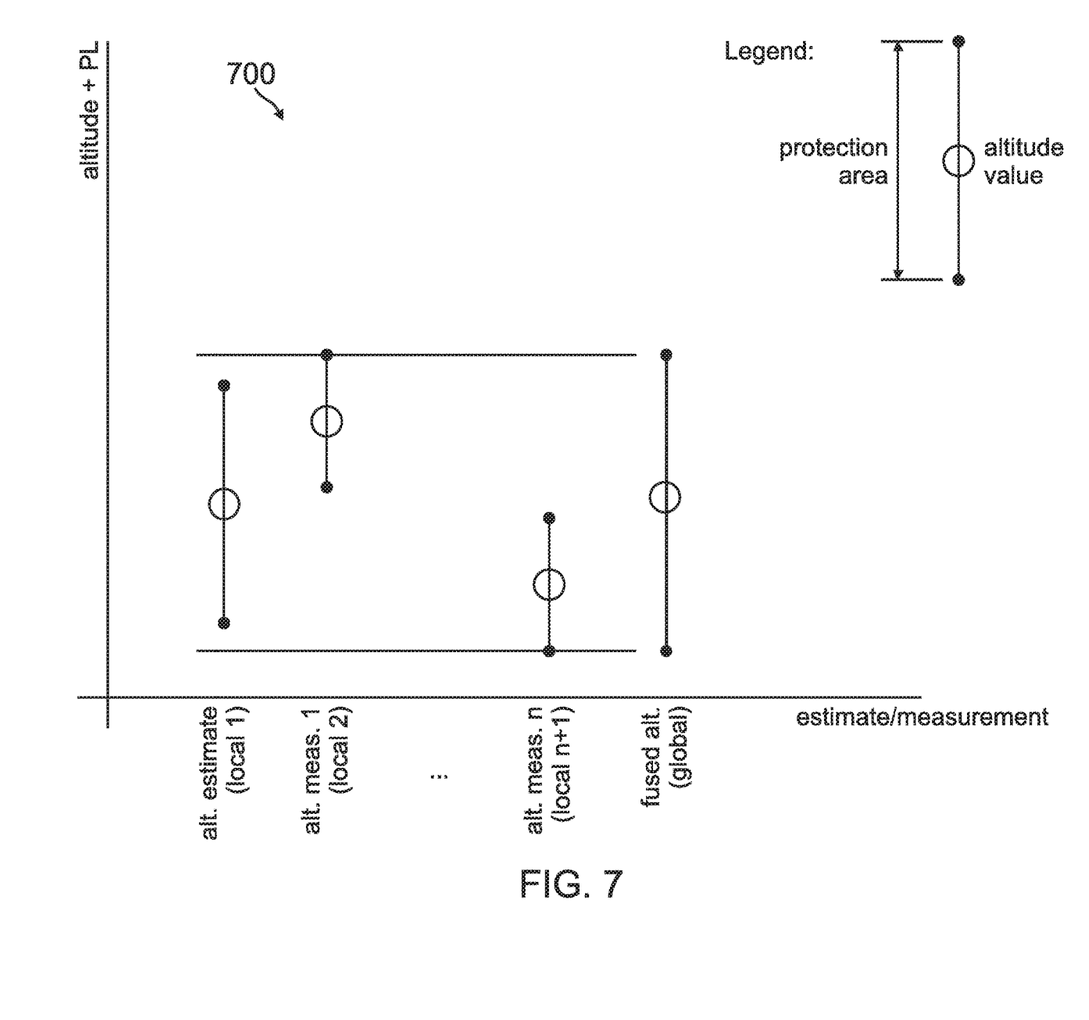
FIG. 7 is a graphical representation of a fusion function in the parallel radar altimeter integrity monitoring for a vehicle.

FIG. 7 is a graphical representation 700 of an exemplary pRIM fusion (merging) function. FIG. 7 shows the altitude and protection level (PL) value for each of an altitude estimate (local 1), and altitude measurements 1 to n (local 2 to local n+1). The estimates are fused to produce the global estimate of altitude above terrain, for example as illustrated in FIG. 7. In this example, the global altitude estimate mean can be computed as a (weighted) average of the local means. The global covariance matrix can be then computed as a (weighted) sum of local variances (assuming mutual independence of local estimates). The global PL can be determined as the protection level overbounding all the local PLs as it can be shown that:

$$p(\mathrm{HMI}_{fused}) \leq p(\mathrm{HMI}_{estim}) \times p(\mathrm{HMI}_{RAmeas,1}) \times \ldots \times p(\mathrm{HMI}_{RAmeas,n}) \quad (5)$$

The pRIM architecture is composed of local blocks providing altitude integration each with ensured integrity. Therefore, the global output is also with ensured integrity and there is no need to detect failed measurements. Detection, if any, is performed in local estimators.

In general, the cRIM method provides estimates with better accuracy than pRIM, while the pRIM method allows for trade-off between accuracy and integrity.

Combined Radar Altimeter Integrity Monitoring

In another embodiment, a combined radar altimeter integrity monitoring architecture (combRIM) is provided, which combines characteristic properties of the cRIM and pRIM approaches. The combRIM method is in principle solution separation but just in the altitude domain.

In the combRIM method, all available radar altimeter measurements and (possibly) altitude estimates are processed (e.g., by averaging filter with or without weights defined by the measurement noise variances) and a global (full-solution) estimate of altitude above terrain is computed. A set of sub-solutions is created (based on faults definition) and a set of sub-solutions estimates of altitude above terrain is computed. A full solution and sub-solution estimates are statistically compared, and protection level for altitude above terrain is computed for required probabilities of missed and false detection.

Figure 8:
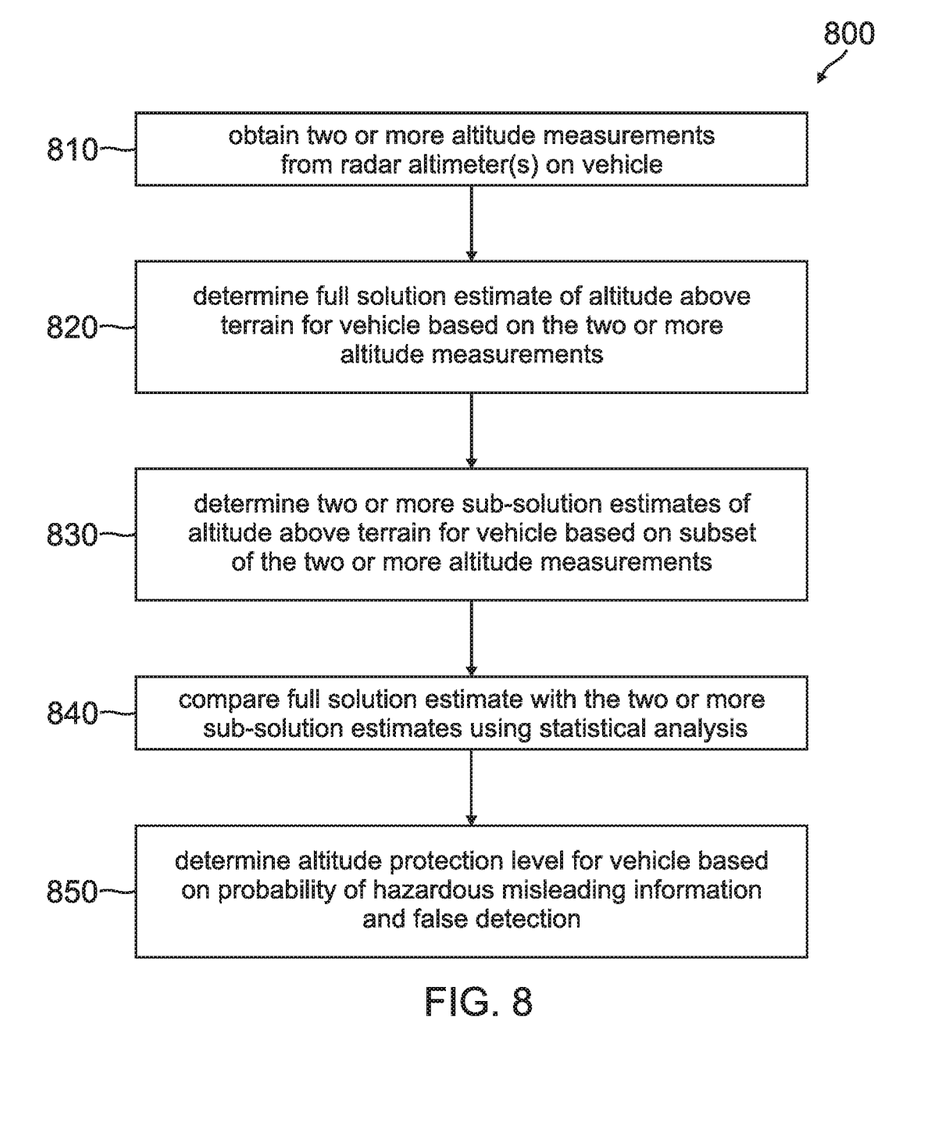
FIG. 8 is a flow diagram for a method of implementing combined radar altimeter integrity monitoring for a vehicle.

FIG. 8 is a flow diagram for a method 800 for implementing the combRIM method. Initially, two or more altitude measurements are obtained from one or more radar altimeters (or other sensors) on a vehicle (block 810). The method 800 determines a full solution estimate of altitude above terrain for the vehicle based on the two or more altitude measurements (block 820), and determines two or more sub-solution estimates of altitude above terrain for the vehicle based on a subset of the two or more altitude measurements (block 830). The method 800 then compares the full solution estimate with the two or more sub-solution estimates using statistical analysis (block 840). An altitude protection level for the vehicle is then determined based on a probability of hazardous misleading information and a probability of false detection (block 850).

The combRIM approach can be implemented with or without the GNSS (or hybridized GNSS/INS) system and terrain map based altitude above terrain. At least two radar altimeter measurements or estimates are needed for detection capability, while at least three radar altimeter measurements or estimates are needed for exclusion capability.

In some embodiments, if two radar altimeter measurements are available, then integrity monitoring with fault detection can be done according to solution separation.

In another embodiment, if two radar altimeter measurements and one altitude estimate (based on terrain map aided GNSS/INS system) is available, then integrity monitoring with fault detection and exclusion can be done according to solution separation.

A computer or processor used in the present system and method can be implemented using software, firmware, hardware, or any appropriate combination thereof, as known to one of skill in the art. These may be supplemented by, or incorporated in, specially-designed application-specific integrated circuits (ASICs) or field programmable gate arrays (FPGAs). The computer or processor can also include functions with software programs, firmware, or other computer readable instructions for carrying out various process tasks, calculations, and control functions used in the present method and system.

The present methods can be implemented by computer executable instructions, such as program modules or components, which are executed by at least one processor. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer-readable or processor-readable instructions. These instructions are typically stored on any appropriate computer program product that includes a computer readable medium used for storage of computer readable instructions or data structures. Such a computer readable medium can be any available media that can be accessed by a general purpose or special purpose computer or processor, or any programmable logic device.

Suitable processor-readable media may include storage or memory media such as magnetic or optical media. For example, storage or memory media may include conventional hard disks, compact disks, DVDs, Blu-ray discs, or other optical storage disks; volatile or non-volatile media such as Random Access Memory (RAM); Read Only Memory (ROM), Electrically Erasable Programmable ROM (EEPROM), flash memory, and the like; or any other media that can be used to carry or store desired program code in the form of computer executable instructions or data structures.

EXAMPLE EMBODIMENTS

Example 1 includes a method for radar altimeter integrity monitoring, the method comprising: obtaining one or more global navigation satellite system (GNSS) measurements, or one or more hybridized GNSS/inertial navigation system (INS) measurements, in an earth-centered-earth-fixed (ECEF) coordinate frame for a vehicle; obtaining one or more altitude measurements from one or more radar altimeters on the vehicle; transforming the one or more altitude measurements into the ECEF coordinate frame using a terrain map and a GNSS or hybridized GNSS/INS based position estimate with ensured integrity; determining a full solution estimate of position for the vehicle based on the transformed one or more altitude measurements, and the one or more GNSS or hybridized GNSS/INS measurements; determining one or more sub-solution estimates of position for the vehicle based on a subset of the transformed one or more altitude measurements, and the one or more GNSS or hybridized GNSS/INS measurements; comparing the full solution estimate with the one or more sub-solution estimates using statistical analysis; and determining an altitude protection level for the vehicle based on a probability of hazardous misleading information and a probability of false detection.

Example 2 includes a navigation system comprising: a processor in a vehicle; a memory unit operatively coupled with the processor, wherein a terrain map is stored in the memory unit; a GNSS receiver operatively coupled with the processor; and one or more radar altimeters operatively coupled with the processor; wherein the processor is configured to execute processor readable instructions to perform the method for radar altimeter integrity monitoring according to Example 1.

Example 3 includes the navigation system of Example 2, further comprising a plurality of inertial sensors operatively coupled with the processor and configured to provide inertial data to the processor.

Example 4 includes the navigation system of Example 3, wherein the inertial sensors are implemented in an inertial measurement unit (IMU).

Example 5 includes the navigation system of any of Examples 2-4, further comprising a barometric altimeter operatively coupled with the processor.

Example 6 includes a computer program product comprising a non-transitory computer readable medium having instructions stored thereon executable by a processor to perform the method for radar altimeter integrity monitoring according to Example 1.

Example 7 includes a method for radar altimeter integrity monitoring, the method comprising: obtaining one or more GNSS measurements, or one or more hybridized GNSS/INS measurements, in an ECEF coordinate frame for a vehicle; obtaining one or more altitude measurements from one or more radar altimeters on the vehicle; determining a first plurality of sub-solution estimates of altitude above terrain with ensured (given) integrity for the vehicle, based on subsets of the one or more GNSS or hybridized GNSS/INS outputs and a terrain map, each sub-solution estimate in the first plurality of sub-solution estimates determined based on a respective sub-set of the one or more GNSS or hybridized GNSS/INS outputs; determining a second plurality of sub-solution estimates of altitude above terrain with ensured (given) integrity for the vehicle, based on a subset of the one or more altitude measurements, each sub-solution estimate in the second plurality of sub-solution estimates determined based on a respective subset of the one or more altitude measurements; and merging the first plurality of sub-solution estimates and the second plurality of sub-solution estimates to determine a full solution or global estimate of altitude above terrain, which provides an altitude protection level for the vehicle.

Example 8 includes a navigation system comprising: a processor in a vehicle; a memory unit operatively coupled with the processor, wherein a terrain map is stored in the memory unit; a GNSS receiver operatively coupled with the processor; and one or more radar altimeters operatively coupled with the processor; wherein the processor is configured to execute processor readable instructions to perform the method for radar altimeter integrity monitoring according to Example 7.

Example 9 includes the navigation system of Example 8, further comprising a plurality of inertial sensors operatively coupled with the processor and configured to provide inertial data to the processor.

Example 10 includes the navigation system of Example 9, wherein the inertial sensors are implemented in an IMU.

Example 11 includes the navigation system of any of Examples 8-10, further comprising a barometric altimeter operatively coupled with the processor.

Example 12 includes a computer program product comprising a non-transitory computer readable medium having instructions stored thereon executable by a processor to perform the method for radar altimeter integrity monitoring according to Example 7.

Example 13 includes a method for radar altimeter integrity monitoring, the method comprising: obtaining two or more altitude measurements from one or more radar altimeters on a vehicle; determining a full solution estimate of altitude above terrain for the vehicle based on the two or more altitude measurements; determining two or more sub-solution estimates of altitude above terrain for the vehicle based on a subset of the two or more altitude measurements; comparing the full solution estimate with the two or more sub-solution estimates using statistical analysis; and determining an altitude protection level for the vehicle based on a probability of hazardous misleading information and a probability of false detection.

Example 14 includes the method of Example 13, further comprising: obtaining one or more GNSS measurements, or one or more hybridized GNSS/INS measurements, in an ECEF coordinate frame for the vehicle; and transforming the one or more altitude measurements into the ECEF coordinate frame using a terrain map and a GNSS or hybridized GNSS/INS based position estimate with ensured integrity.

Example 15 includes a navigation system comprising: a processor in a vehicle; and one or more radar altimeters operatively coupled with the processor; wherein the processor is configured to execute processor readable instructions to perform the method for radar altimeter integrity monitoring according to Example 13.

Example 16 includes a navigation system comprising: a processor in a vehicle; a memory unit operatively coupled with the processor, wherein a terrain map is stored in the memory unit; a GNSS receiver operatively coupled with the processor; and one or more radar altimeters operatively coupled with the processor; wherein the processor is configured to execute processor readable instructions to perform the method for radar altimeter integrity monitoring according to Example 14.

Example 17 includes the navigation system of Example 16, further comprising a plurality of inertial sensors operatively coupled with the processor and configured to provide inertial data to the processor.

Example 18 includes the navigation system of Example 17, wherein the inertial sensors are implemented in an IMU.

Example 19 includes a computer program product comprising a non-transitory computer readable medium having instructions stored thereon executable by a processor to perform the method for radar altimeter integrity monitoring according to Example 13.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A method for radar altimeter integrity monitoring, the method comprising:

obtaining one or more global navigation satellite system (GNSS) measurements, or one or more hybridized GNSS/inertial navigation system (INS) measurements, in an earth-centered-earth-fixed (ECEF) coordinate frame for a vehicle;

obtaining one or more altitude measurements from one or more radar altimeters on the vehicle;

transforming the one or more altitude measurements into the ECEF coordinate frame using a terrain map and a GNSS or hybridized GNSS/INS based position estimate with ensured integrity, wherein the transformed one or more altitude measurements are given by the following equation:

$$\tilde{\rho}_{RA,transformed} = \tilde{\rho}_{RA} + \hat{\rho}_{TERMAP}$$

where $\tilde{\rho}_{RA}$ is the radar altimeter measurement, and $\hat{\rho}_{TERMAP}$ is an estimate of orthogonal distance between an ECEF frame origin and terrain at a point given by a horizontal position of the vehicle and the terrain map;

computing one or more characteristics of the transformed one or more altitude measurements, including orthogonal distance $\rho_{TERMAP}$ moments, wherein a mean value of the orthogonal $\rho_{TERMAP}$ distance moments is computed as:

$$\hat{\rho}_{TERMAP} = E[\rho_{TERMAP}] = \text{function}_1(\hat{\rho}_{HOR}, \text{map}),$$

where $\hat{\rho}_{HOR}$ is a horizontal position estimate of the vehicle and map is the terrain map;

determining a full solution estimate of position for the vehicle based on the transformed one or more altitude measurements, and the one or more GNSS or hybridized GNSS/INS measurements;

determining one or more sub-solution estimates of position for the vehicle based on a subset of the transformed one or more altitude measurements, and the one or more GNSS or hybridized GNSS/INS measurements;

comparing the full solution estimate with the one or more sub-solution estimates using statistical analysis; and determining an altitude protection level for the vehicle based on a probability of hazardous misleading information and a probability of false detection.

2. A navigation system, comprising:
a processor in a vehicle;
a memory unit operatively coupled with the processor, wherein a terrain map is stored in the memory unit;
a global navigation satellite system (GNSS) receiver operatively coupled with the processor; and
one or more radar altimeters operatively coupled with the processor;
wherein the processor is configured to execute processor readable instructions to perform the method for radar altimeter integrity monitoring according to claim 1.

3. The navigation system of claim 2, further comprising a plurality of inertial sensors operatively coupled with the processor and configured to provide inertial data to the processor.

4. The navigation system of claim 3, wherein the inertial sensors are implemented in an inertial measurement unit (IMU).

5. The navigation system of claim 2, further comprising a barometric altimeter operatively coupled with the processor.

6. A computer program product, comprising:
a non-transitory computer readable medium having instructions stored thereon executable by a processor to perform the method for radar altimeter integrity monitoring according to claim 1.

7. A method for radar altimeter integrity monitoring, the method comprising:
obtaining one or more global navigation satellite system (GNSS) measurements, or one or more hybridized GNSS/inertial navigation system (INS) measurements, in an earth-centered-earth-fixed (ECEF) coordinate frame for a vehicle;
obtaining one or more altitude measurements from one or more radar altimeters on the vehicle;
determining a first plurality of sub-solution estimates of altitude above terrain with ensured integrity for the vehicle, based on subsets of the one or more GNSS or hybridized GNSS/INS outputs and a terrain map, each sub-solution estimate in the first plurality of sub-solution estimates determined based on a respective sub-set of the one or more GNSS or hybridized GNS SANS outputs;

computing a variance of the estimates of altitude as:

$$\text{var}[\rho_{TERMAP}] = \sigma_{MAP}^2 + \sigma_{MAP,HPint}^2$$

where $\sigma_{MAP}^2$ is given by accuracy of the terrain map, and $\sigma_{MAP,HPint}^2$ describes additional uncertainty given by a GNSS horizontal position protection area, wherein $\sigma_{MAP,HPint}^2$ is computed on the basis of terrain map evaluation at multiple points within the protection area given by a horizontal protection level (HPL) as:

$$\sigma_{MAP,HPint}^2 = \text{function}_2(\hat{\rho}_{HOR}, \text{HPL}, \text{map});$$

determining a second plurality of sub-solution estimates of altitude above terrain with ensured integrity for the vehicle, based on a subset of the one or more altitude measurements, each sub-solution estimate in the second plurality of sub-solution estimates determined based on a respective subset of the one or more altitude measurements; and merging the first plurality of sub-solution estimates and the second plurality of sub-solution estimates to determine a full solution or global estimate of altitude above terrain, which provides an altitude protection level for the vehicle, wherein a global altitude estimate mean is computed as a weighted average of local mean estimates, and a global covariance matrix is computed as a weighted sum of local variances, wherein a global protection level is determined as the protection level overbounding all local protection levels, in that:

$$p(\text{HMI}_{fused}) \leq p(\text{HMI}_{estim}) \times p(\text{HMI}_{RAmeas,1}) \times \ldots \times p(\text{HMI}_{RAmeas,n})$$

where p(HMI) is the probability of hazardous misleading information.

8. A navigation system, comprising:
a processor in a vehicle;
a memory unit operatively coupled with the processor, wherein a terrain map is stored in the memory unit;
a global navigation satellite system (GNSS) receiver operatively coupled with the processor; and
one or more radar altimeters operatively coupled with the processor;
wherein the processor is configured to execute processor readable instructions to perform the method for radar altimeter integrity monitoring according to claim 7.

9. The navigation system of claim 8, further comprising a plurality of inertial sensors operatively coupled with the processor and configured to provide inertial data to the processor.

10. The navigation system of claim 9, wherein the inertial sensors are implemented in an inertial measurement unit (IMU).

11. The navigation system of claim 8, further comprising a barometric altimeter operatively coupled with the processor.

12. A computer program product, comprising:
a non-transitory computer readable medium having instructions stored thereon executable by a processor to perform the method for radar altimeter integrity monitoring according to claim 7.

* * * * *

UNITED STATES PATENT AND TRADEMARK OFFICE
CERTIFICATE OF CORRECTION

PATENT NO. : 10,422,872 B2
APPLICATION NO. : 15/170322
DATED : September 24, 2019
INVENTOR(S) : Jindrich Dunik et al.

It is certified that error appears in the above-identified patent and that said Letters Patent is hereby corrected as shown below:

In the Claims

In Claim 1, Column 11, Line 2, change "the orthogonal $\rho_{TERMAP}$ distance moments is computed as" to "the orthogonal distance $\rho_{TERMAP}$ moments is computed as"

In Claim 7, Column 12, Line 2, change "hybridized GNS SANS outputs" to "hybridized GNS/INS outputs"

Signed and Sealed this
Twelfth Day of November, 2019

Andrei Iancu
*Director of the United States Patent and Trademark Office*